United States Patent
Longoria (10) Patent No.: US 9,807,978 B2
(45) Date of Patent: Nov. 7, 2017

(54) GROOMING APPARATUS AND KNOT REMOVER

(71) Applicant: Longoria Design LLC, Miami, FL (US)

(72) Inventor: Jose Longoria, Miami, FL (US)

(73) Assignee: LONGORIA DESIGN LLC, Miami, FL (US)

( * ) Notice: Subject to any disclaimer, the term of this patent is extended or adjusted under 35 U.S.C. 154(b) by 74 days.

(21) Appl. No.: 14/671,801

(22) Filed: Mar. 27, 2015

(65) Prior Publication Data
US 2015/0201582 A1  Jul. 23, 2015

Related U.S. Application Data

(60) Provisional application No. 61/995,195, filed on Apr. 3, 2014.

(51) Int. Cl.
*A01K 13/00* (2006.01)

(52) U.S. Cl.
CPC ....... *A01K 13/002* (2013.01); *Y10T 29/49002* (2015.01); *Y10T 29/49105* (2015.01)

(58) Field of Classification Search
CPC .............................. A01K 13/00; A01K 13/002
USPC .......................................... 119/609, 610, 617
See application file for complete search history.

(56) References Cited

U.S. PATENT DOCUMENTS

| | | | |
|---|---|---|---|
| 2,753,583 A | 7/1956 | Jepson | |
| 4,362,173 A | 12/1982 | Blinman | |
| 4,937,940 A * | 7/1990 | Mason | B26B 21/40 30/136 |
| 6,336,428 B1 * | 1/2002 | Locke | A45D 24/32 119/611 |
| 6,668,758 B1 * | 12/2003 | Davis, Jr. | A01K 13/002 119/608 |
| 8,132,541 B1 | 3/2012 | Baer, Jr. | |
| 8,342,187 B2 * | 1/2013 | Kalman | A45D 24/10 119/609 |

(Continued)

FOREIGN PATENT DOCUMENTS

| | | |
|---|---|---|
| CN | 201182129 Y | 1/2009 |
| CN | 102283136 A | 7/2011 |

(Continued)

OTHER PUBLICATIONS

PCT/US2015/023224—International Search Report. dated Jul. 13, 2015.

(Continued)

*Primary Examiner* — Monica Williams
*Assistant Examiner* — Aaron Rodziwicz
(74) *Attorney, Agent, or Firm* — Thomas | Horstemeyer LLP; Randy R. Schoen (57) ABSTRACT

A pet or human battery operated grooming apparatus having a housing, a number of tines formed in the housing, each tine having a slot, and a number of disk shaped blades mounted to a shaft, the shaft mounted in the housing and the blades disposed in the tine slots. A protective cover encloses most of each blade leaving only a slit open to the blade. The tines direct knots or tangles in the hair or fur of the pet, or hair of a human, to the slits and the blades. The user may then rotate the blades to cut the knots. This process occurs without any undue pulling of the associated skin of the animal or human.

20 Claims, 9 Drawing Sheets

(56) References Cited

U.S. PATENT DOCUMENTS

| | | | | |
|---|---|---|---|---|
| 8,573,231 B2* | 11/2013 | Ragosta | ................ | A45D 20/50 |
| | | | | 132/119.1 |
| 9,049,844 B2* | 6/2015 | Fung | ................... | A01K 13/003 |
| 9,301,499 B2* | 4/2016 | Holt, Jr. | ................ | A01K 13/002 |
| 2005/0081875 A1* | 4/2005 | Wang | ................... | A01K 13/002 |
| | | | | 132/219 |
| 2005/0217119 A1 | 10/2005 | Rapp | | |
| 2007/0130780 A1 | 6/2007 | Hobbs | | |
| 2007/0193529 A1* | 8/2007 | Vandervoet | ......... | A01K 13/002 |
| | | | | 119/617 |
| 2009/0320767 A1* | 12/2009 | Werner | ............... | A01K 13/002 |
| | | | | 119/609 |
| 2010/0186679 A1* | 7/2010 | Woods | ................ | A01K 13/002 |
| | | | | 119/601 |
| 2011/0173816 A1 | 7/2011 | Ben-Ari | | |
| 2011/0180013 A1 | 7/2011 | Kissel, Jr. | | |
| 2013/0133587 A1* | 5/2013 | Pelfrey | ............... | A01K 13/002 |
| | | | | 119/625 |
| 2014/0026821 A1* | 1/2014 | Tu | ....................... | A01K 13/002 |
| | | | | 119/600 |
| 2014/0053407 A1 | 2/2014 | Michaely | | |
| 2014/0238310 A1* | 8/2014 | Holt, Jr. | ............... | A01K 13/002 |
| | | | | 119/631 |
| 2014/0261226 A1* | 9/2014 | Fung | .................... | A01K 13/003 |
| | | | | 119/625 |
| 2016/0073612 A1* | 3/2016 | Cafasso | ................ | A45D 24/10 |
| | | | | 119/601 |

FOREIGN PATENT DOCUMENTS

| | | |
|---|---|---|
| CN | 102139488 A | 8/2011 |
| CN | 202211063 U | 5/2012 |
| CN | 102919140 | 2/2013 |
| GB | 2460698 A | 12/2009 |
| JP | 2004236766 A | 8/2004 |

OTHER PUBLICATIONS

PCT/US2015/023224—Written Opinion of the International Searching Authority, dated Jul. 13, 2015.

PCT/US2015/023224—Notification of Transmittal of the International Search Report and the Written Opinion of the International Searching Authority or the Declaration. Jul. 13, 2015.

* cited by examiner

GROOMING APPARATUS AND KNOT REMOVER

PRIORITY CROSS-REFERENCE TO RELATED APPLICATION

This application claims priority pursuant to 35 U.S.C. 119(e) or 120 from U.S. Provisional Applications No. 61/995,195, filed Apr. 3, 2014.

FIELD OF THE INVENTION

The present invention relates to a grooming apparatus, and more particularly, to a grooming apparatus that makes animal hair and fur knot removal easy, safe and relatively painless.

BACKGROUND OF THE INVENTION

A major problem plaguing pet owners involves the grooming of dogs and cats having hair or fur that knots or become entangled with foreign matters. The usual solution is brushing and/or combing. However, brushing and combing is often painful for the pet as the pet's skin may be pulled during the brushing or combing process. The brushing and combing process is also tedious and time consuming for the pet owner. Existing grooming tools include combs with sharp edges that cut knots and tangles but these are often dangerous for both the pet and the user who may be cut by such tools. Furthermore, such tools may leave a pet's hair or fur damaged and unsightly if the cut is made across the grain of the hair. The cuts become visible and are not very attractive.

The invention discussed below in connection with the described preferred and other embodiments addresses these and other deficiencies of the prior art. The features and advantages of the present invention will be explained in, or become apparent from, the following summary and detailed description of the preferred and other embodiments considered together with the accompanying drawings.

SUMMARY OF THE INVENTION

In accordance with the present invention, an advantageous method and apparatus are provided in the form of a grooming apparatus that reduces or eliminates pain during the grooming of a pet. The apparatus is easy to use, very efficient and provides for an enhanced pet appearance. Typically the hair or fur of a pet becomes knotted especially if the animal is kept out of doors. Combing or brushing may be painful if a knot is encountered and the comb or brush pulls the skin of the animal as the device works through the knot. Pulling the skin is also unavoidable as the brush or comb comes upon the knot and during the time when the knot must be held because the user wishes to cut the knot with a scissors. With the grooming apparatus disclosed in detail below, the combing action is smoothly accomplished because when a knot is encountered a user merely activates cutting blades incorporated in the apparatus to remove the knot almost simultaneously with the encounter. The grooming apparatus is simple to make, inexpensive and yet, is structurally robust.

Briefly summarized, the invention relates to a grooming apparatus including a housing having a handle portion and a comb portion, the comb portion having a plurality of tines, a rotatable shaft mounted in the housing, a plurality of blades activated with the shaft, each blade of the plurality of blades being aligned with a corresponding tine of the plurality of tines, a protective guard connected to the housing and partially covering the plurality of blades, and structure connected to the shaft and mounted in the housing for causing the shaft to rotate.

The invention also relates to a method for making a grooming apparatus, the steps of the method including forming a housing, the housing including a handle portion and a comb portion, the comb portion having a plurality of tines, wherein each tine includes a slot, mounting a shaft with spaced apart blades in the housing, each blade of the plurality of blades being aligned with and disposed through a corresponding tine slot, connecting a protective guard to the housing for partially covering the plurality of blades, mounting a motor to the housing for engaging the shaft, and forming a battery compartment in the housing for storing batteries to energize the motor.

BRIEF DESCRIPTION OF THE DRAWINGS

For the purpose of facilitating an understanding of the invention, the accompanying drawings and detailed description illustrate a preferred and other embodiments thereof, from which the invention, its structures, its construction and operation, its processes, and many related advantages may be readily understood and appreciated.

DETAILED DESCRIPTION OF THE EMBODIMENTS

The following description is provided to enable those skilled in the art to make and use the described preferred and other embodiments set forth in the best mode contemplated for carrying out the invention. Various modifications, equivalents, variations, and alternatives, however, will remain readily apparent to those skilled in the art. Any and all such modifications, variations, equivalents, and alternatives, such as the other embodiment described in detail here, are intended to fall within the spirit and scope of the present invention.

Figure 1:
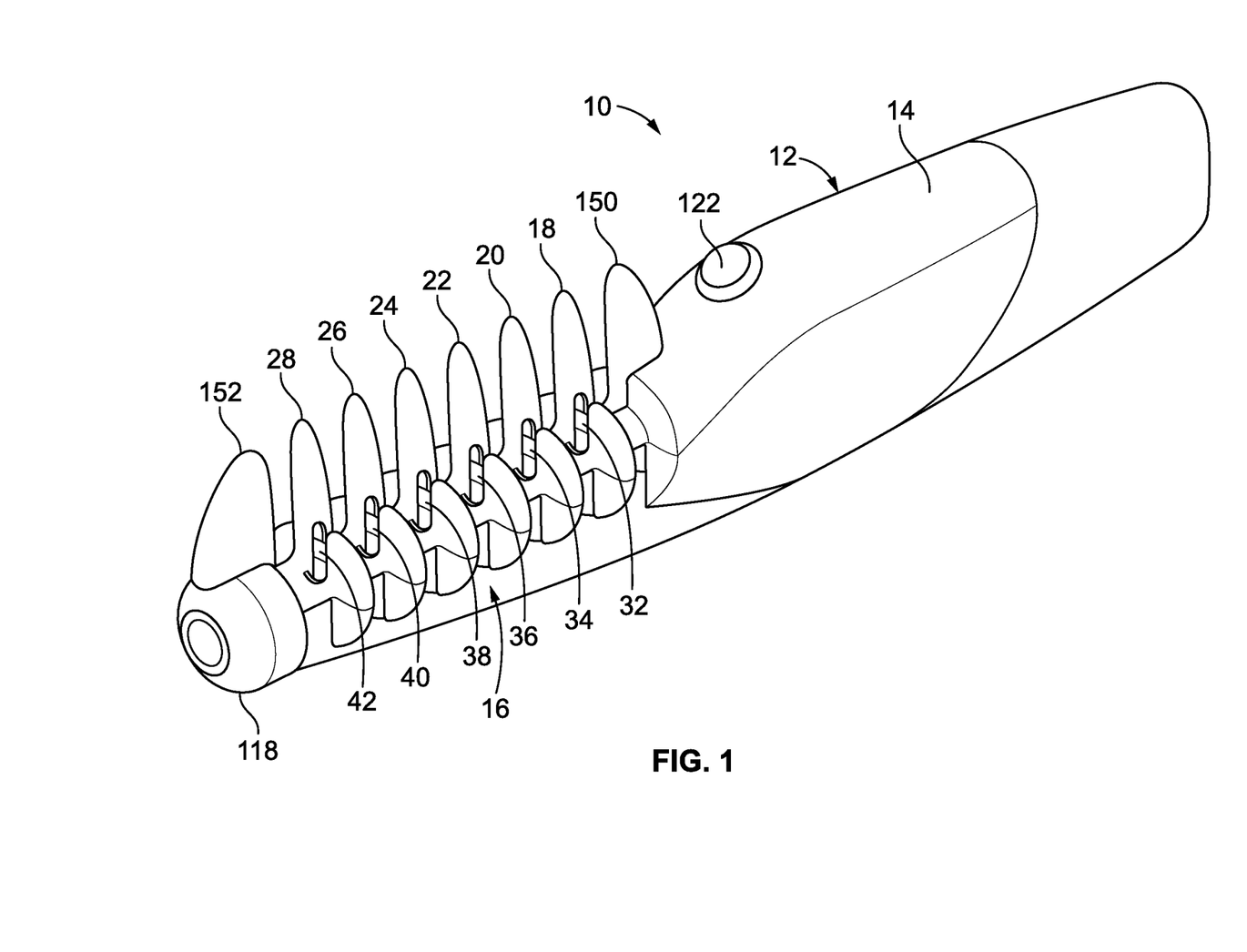
FIG. 1 is an isometric view of a preferred embodiment of a grooming apparatus of the present invention.
Figure 2:
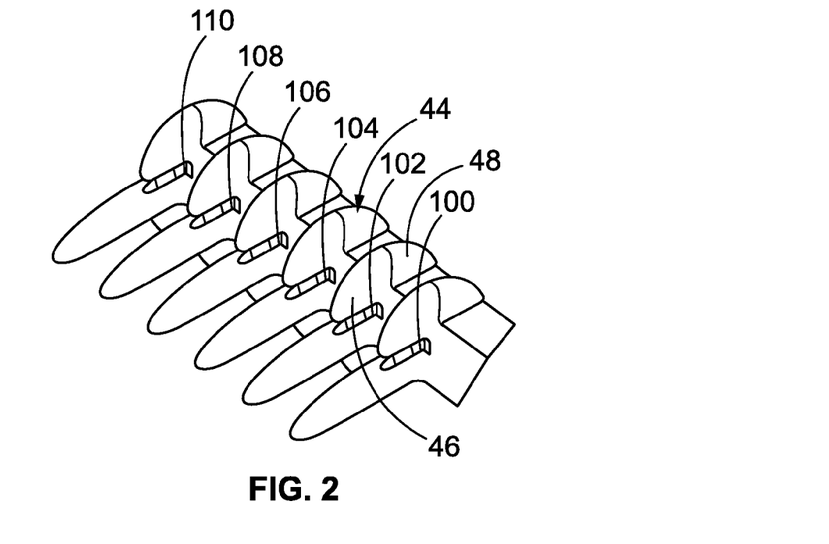
FIG. 2 is an isometric view of tines, blades and a protective cover of the grooming apparatus shown in FIG. 1.
Figure 3:
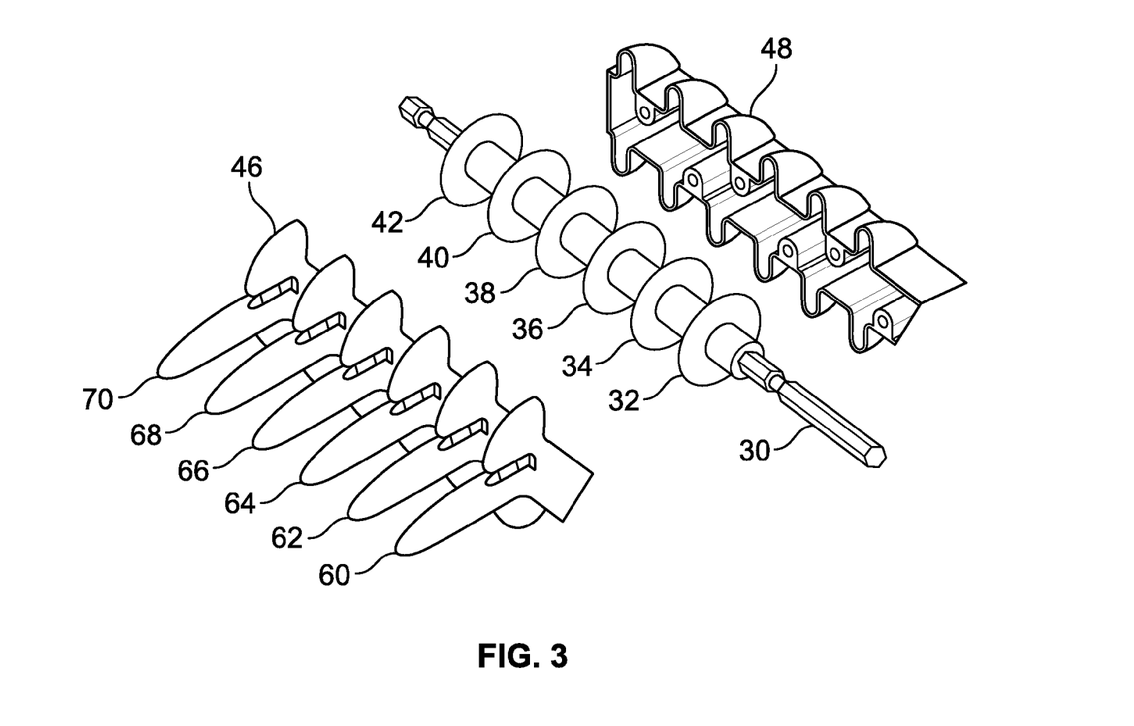
FIG. 3 is an exploded isometric view of the tines, the blades and the protective cover shown in FIG. 2.

Referring to FIGS. 1-3, there is shown a preferred embodiment of the invention in the form of a grooming apparatus 10 having a housing 12, FIG. 1, the housing 12 including a handle portion 14 and a comb portion 16. The comb portion 16 of the housing includes a plurality of tines 18, 20, 22, 24, 26, 28. Mounted in the handle portion 14 of the housing 12 is a rotatable shaft 30, FIG. 3. Mounted to the shaft 30 is a plurality of cutting blades 32, 34, 36, 38, 40, 42, which are rotatable with the shaft 30. Accordingly the plurality of cutting blades 32, 34, 36, 38, 40, 42 may be activated by being mounted to and rotatable with the shaft in the present embodiment. Each blade of the plurality of blades 32, 34, 36, 38, 40, 42 is aligned with a corresponding tine of the plurality of tines 18, 20, 22, 24, 26, 28, as shown in FIGS. 1 and 2. A protective guard 44, FIG. 2, is connected to the housing 12 for partially covering the plurality of blades, the protective guard 44 having an forward portion 46 which may be molded integral with the tines 18, 20, 22, 24, 26, 28 and a rear portion 48 integral with a portion of the housing and mounted to the forward portion 46. Structure connected to the shaft 30 and mounted in the housing 12, for example, a motor 50, FIG. 5, and a set of batteries 52, 54, 56, 58 cause the shaft 30 to rotate when the motor is activated.

Figure 4:
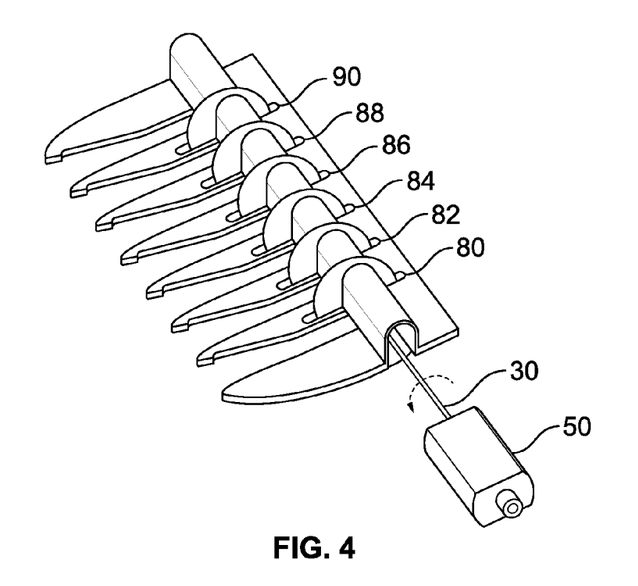
FIG. 4 is a diagrammatic isometric view of modified tines, the blades, spacers and a motor.

Each of the tines 18, 20, 22, 24, 26, 28 is tapered with a rounded nose portion 60, 62, 64, 66, 70, FIG. 3. Each of the tines also includes a slot 80, 82, 84, 86, 88, 90. Each of the blades 32, 34, 36, 38, 40, 42 is disposed in a corresponding one of the slots 80, 82, 84, 86, 88, 90, FIG. 5, as shown in FIGS. 1, 2 and 4. The protective guard 44 extends like a hood over each of the blades and each of the slots to expose only a small portion of each blade through slit openings 100, 102, 104, 106, 108, 110, FIG. 2. The slit openings 100, 102, 104, 106, 108, 110 allow fur and hair pick up by the tines to be directed to the blades while the protective guard protects a user's hand from inadvertently coming into contact with the blades. A rearward end 112, FIG. 5, of the shaft 30 may have a hexagon cross-section and is engaged with the motor 50. A forward end 114, FIG. 5, of the shaft 30 may have a circular cross-section and is mounted in a bushing 116 and enclosed by a cap 118. The motor 50 is connected to the batteries 52, 54, 56, 58 and the batteries are located in a battery compartment 120. A switch button 122, FIGS. 1 and 5, mounted to the handle portion 14 of the housing 12 may be depressed by a user, shown in FIG. 7, to activate the motor 50 to rotate the blades 32, 34, 36, 38, 40, 42.

Figure 5:
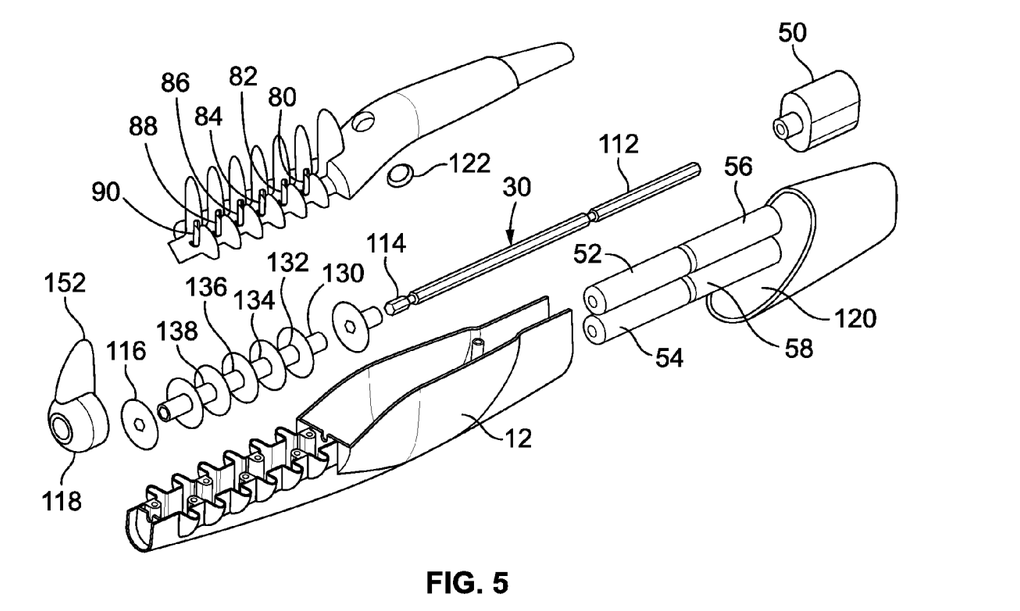
FIG. 5 is an exploded isometric view of the grooming apparatus shown in FIG. 1.

A plurality of spacers 130, 132, 134, 136, 138, FIG. 5, are mounted to the shaft 30 and alternate with the plurality of blades 32, 34, 36, 38, 40, 42 such that each of the blades is separated from an adjacent blade by a precise distance as shown in FIG. 5. Each of the blades is shaped as a thin circular disk with a sharp periphery. The blades and spacers may have hexagon shaped openings to mate with the hexagon shaped shaft 30 as shown for the blades in FIG. 3. A guide tine 150, FIG. 1, may be connected to the housing 12 and an oppositely disposed guide tine 152 may be connected to the cap 118.

In the alternative, the tines may be shaped differently, for example as shown in FIG. 4, and the blades and spacers may have grooves that receive and engage a key mounted on the shaft. Or, the blades and spacers may be threaded onto the shaft, or connected in some other suitable fashion.

Figure 6:
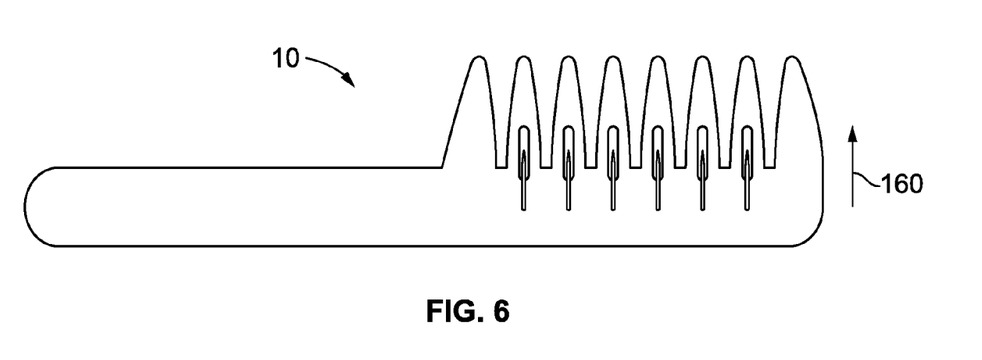
FIG. 6 is a diagrammatic plan view of the tines, the blades, slots in the tines and a handle.
Figure 7:
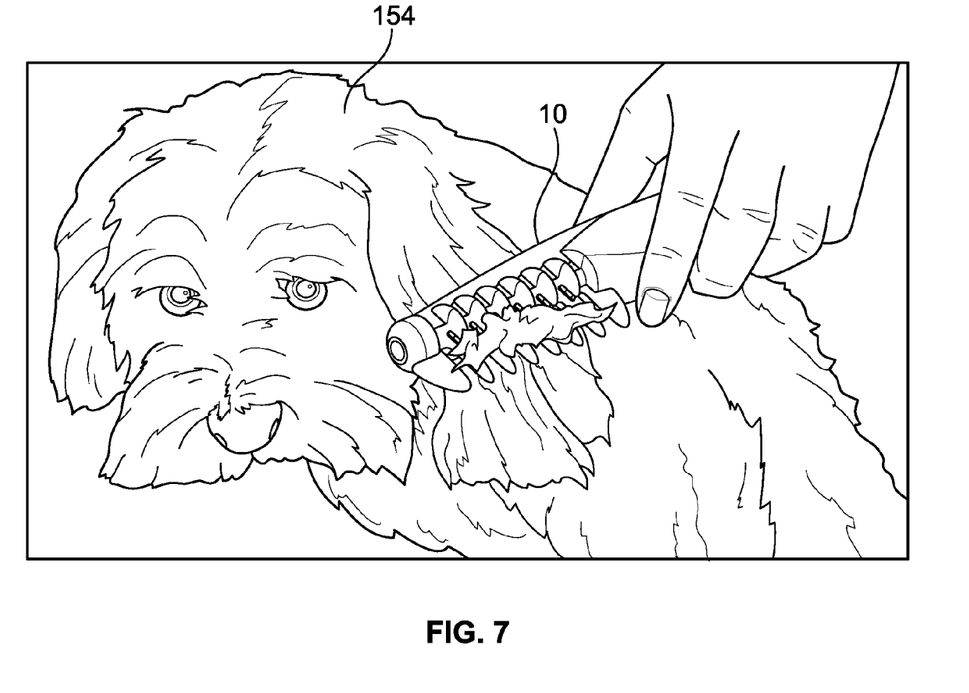
FIG. 7 is an isometric view of a user combing a dog with the grooming apparatus shown in FIG. 1.
Figure 8:
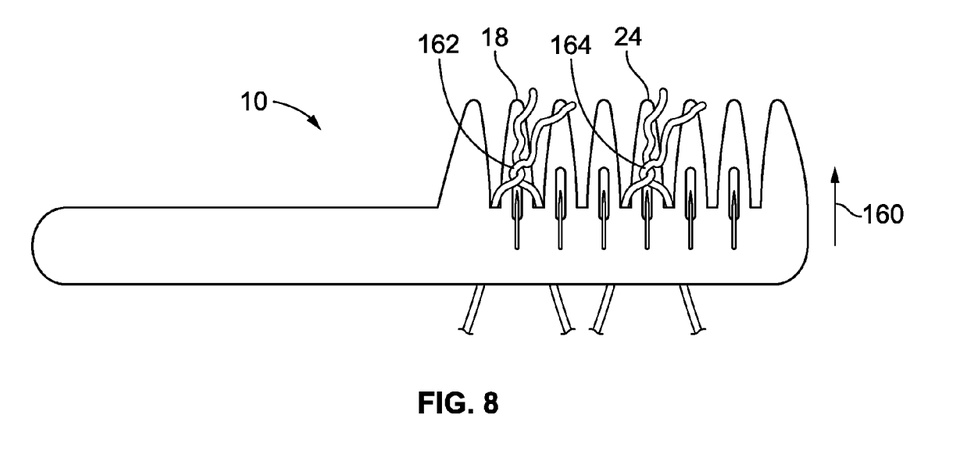
FIG. 8 is a diagrammatic plan view of the tines, the blades, the slots in the tines and the handle when encountering a couple of fur knots.
Figure 9:
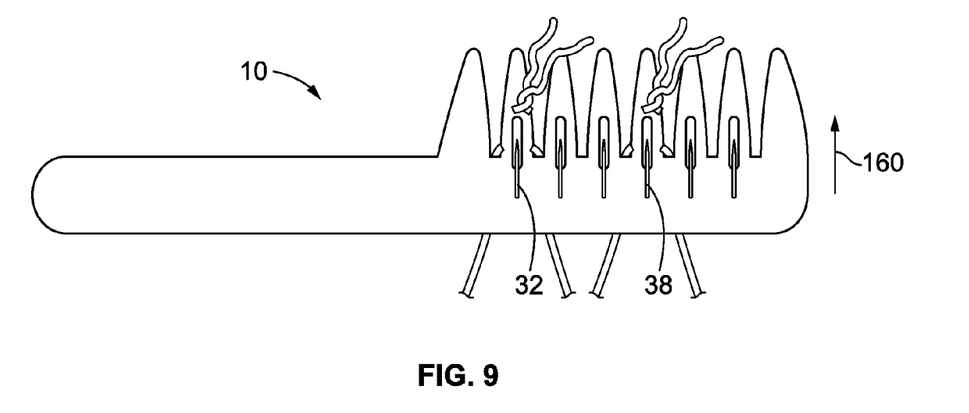
FIG. 9 is a diagrammatic plan view as shown in FIG. 8, illustrating the knots being cut by the blades.

In operation, the handle portion 14 of the housing 12 is gripped by a user and positioned to move along the hair or fur of a pet 154, for example, as shown in FIGS. 6 and 7. Movement of the grooming apparatus 10 is illustrated by an arrow 160, FIGS. 6, 8 and 9, causes knots 162, 164, FIG. 8, in the fur to be scooped up by the tines 18, 24 as shown in FIG. 8. The knots are pushed back along the tines by the movement 160 and are presented to the blades 32, 38. When the user energizes the blades by depressing the switch button 122, the knots are severed from the fur as shown in FIG. 9. This process minimizes or eliminates stretching of the skin and provides for a smooth aesthetic appearance as opposed to the chopped-up appearance often resulting from the use of a comb and scissors.

Figure 10:
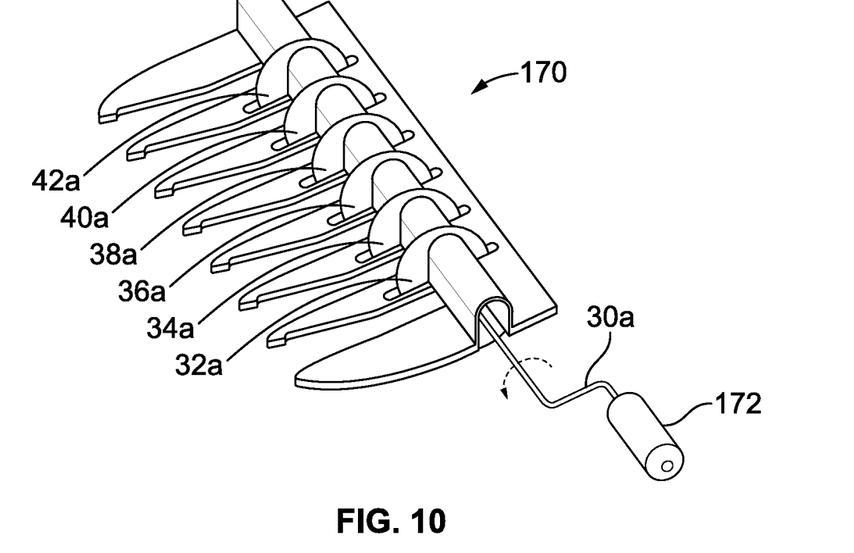
FIG. 10 is a diagrammatic isometric view of the modified tines, the blades, spacers and a manual crank.
Figure 11:
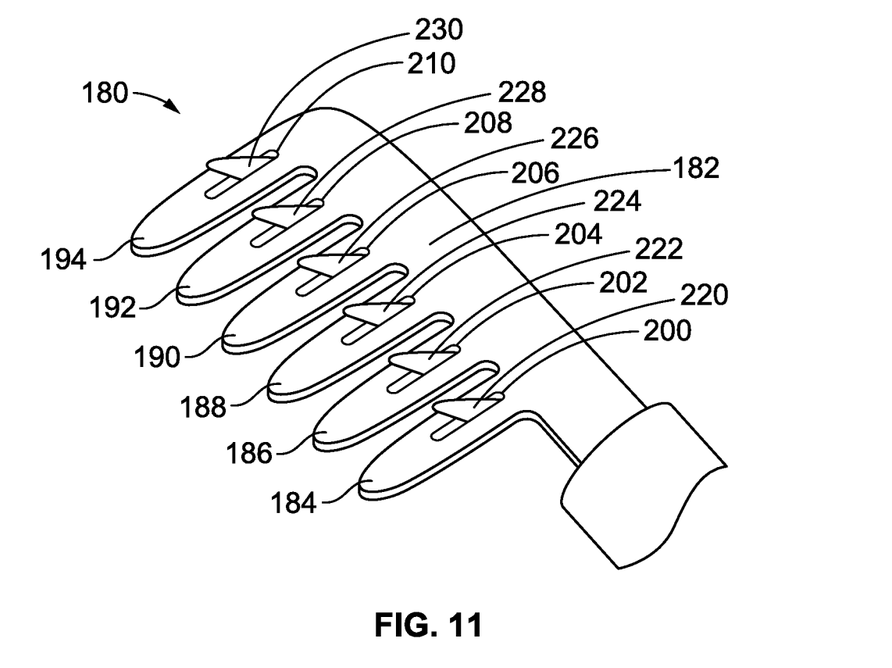
FIG. 11 is a diagrammatic isometric view of an alternative embodiment showing tines and extending blades.

A variation of the grooming apparatus 10 is shown in FIG. 10, where a grooming apparatus 170 includes a manual crank 172, and the crank 172 is used as the structure to rotate the shaft 30a to which blades 32a, 34a, 36a, 38a, 40a, 42a are mounted. A modified apparatus is shown in FIG. 11, where a grooming apparatus 180 includes a comb portion 182 with tines 184, 186, 188, 190, 192, 194. Each tine includes a corresponding slot 200, 202, 204, 206, 208, 210, and extending through each slot is a corresponding knife shaped cutting blade 220, 222, 224, 226, 228, 230. The blades may otherwise be activated to move up and down in a scissors fashion to cut knots in the fur, or the blades may be mounted to vibrate where the vibrating blades cut the knots.

Figure 12:
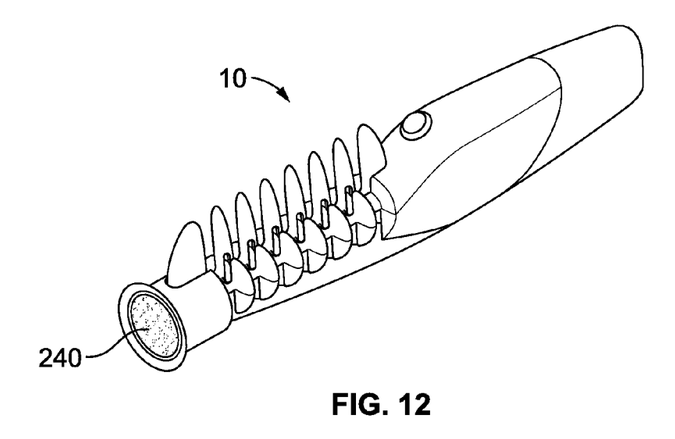
FIG. 12 is an isometric view of the grooming apparatus with a nail file accessory.
Figure 13:
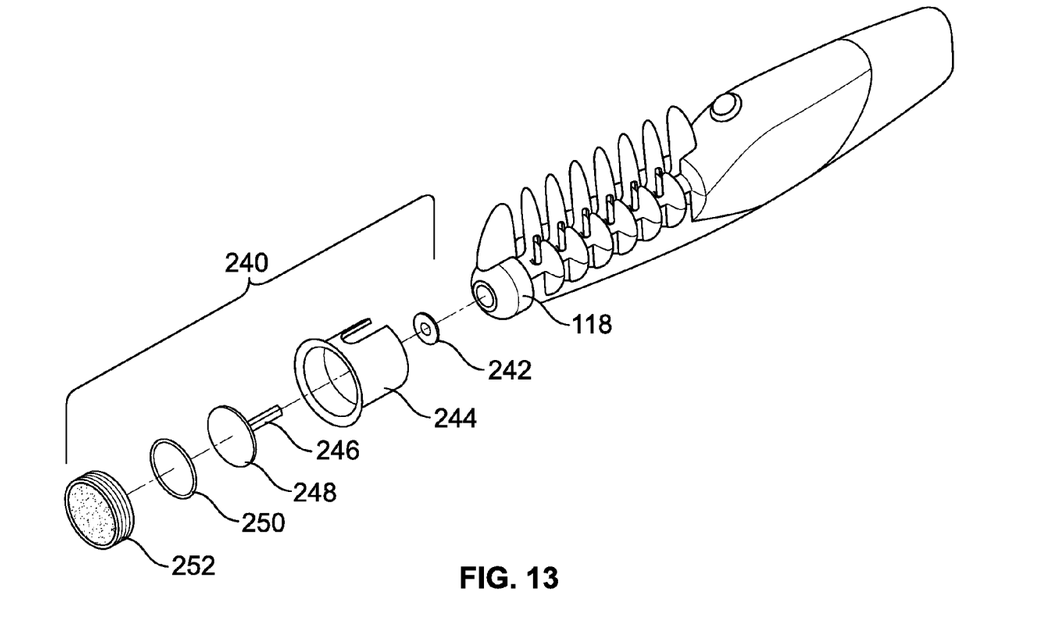
FIG. 13 is an exploded isometric view of the grooming apparatus with the nail file accessory shown in FIG. 12.

Referring to FIGS. 12 and 13, the grooming apparatus 10 is shown with an accessory nail file or sander 240. The nail file accessory 240 includes a bushing 242, a file housing 244 that snaps over the cap 118, a hexagon shaped shaft 246 with a rotating disk 248 and a peel-and-stick sand paper disk 250 mounted to a sand paper cap 252.

Figure 14:
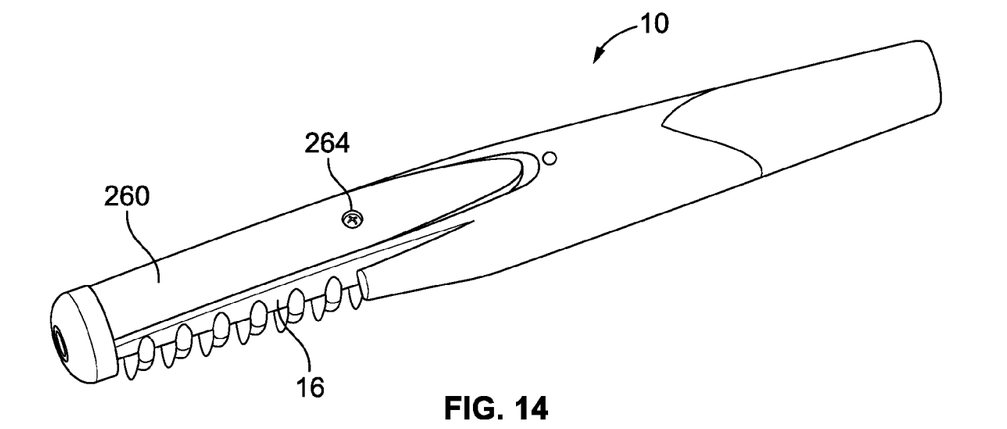
FIG. 14 is a bottom isometric view of the grooming apparatus shown in FIG. 1, illustrating an access panel.
Figure 15:
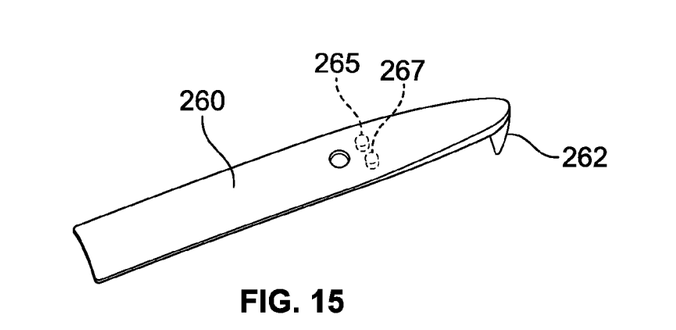
FIG. 15 is an isometric view of the access panel illustrating a sharp pick and two pins.
Figure 16:
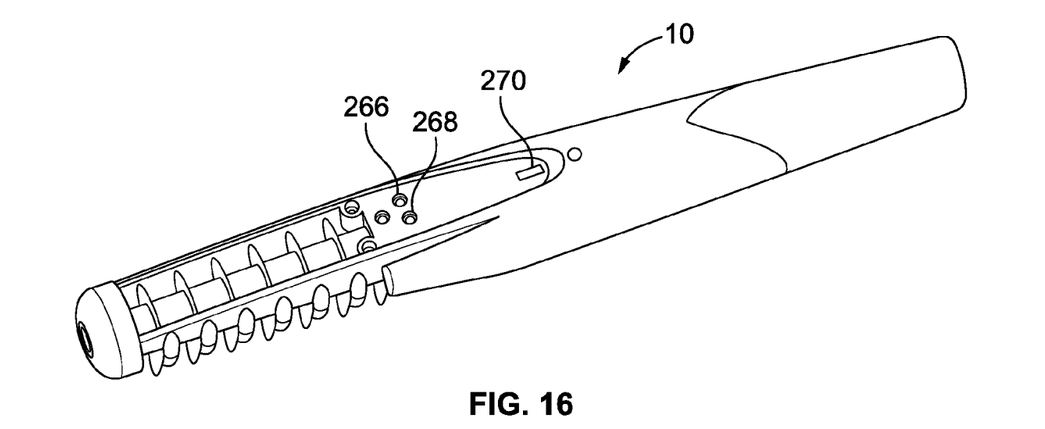
FIG. 16 is an isometric view of the grooming apparatus shown in FIG. 14 with the access panel removed and illustrating two safety switches and a pick slot.

An access panel 260, FIGS. 14-16, with a sharp pick 262 is connected to the bottom of the comb portion 16 of the housing 12 by a fastener 264. The pick 262 is provided to help cut hair, fur and other debris that may be wound around the spacers, the blades and the shaft after use so that the hair, fur and debris may be easily removed. The access panel 260 includes two pins 265, 267 for engaging two safety switches 266, 268 that prevent activation of the motor 50 when the panel 260 is removed as shown in FIG. 16. The safety switches are recessed so that a user's fingers are unable to come into contact. A slot 270 in the housing is provided to accommodate the pick 262.

It is noted that throughout this description, words such as "upper," "lower," "forward" and "rearward" as well as similar locational or positional terms, refer to portions or elements of the grooming apparatus as it is viewed in the drawings relative to other portions of the apparatus.

It is now apparent that the grooming apparatus described in detail here has the advantage of easily eliminating knots in hair or fur and may even be used for people with long hair.

Figure 17:
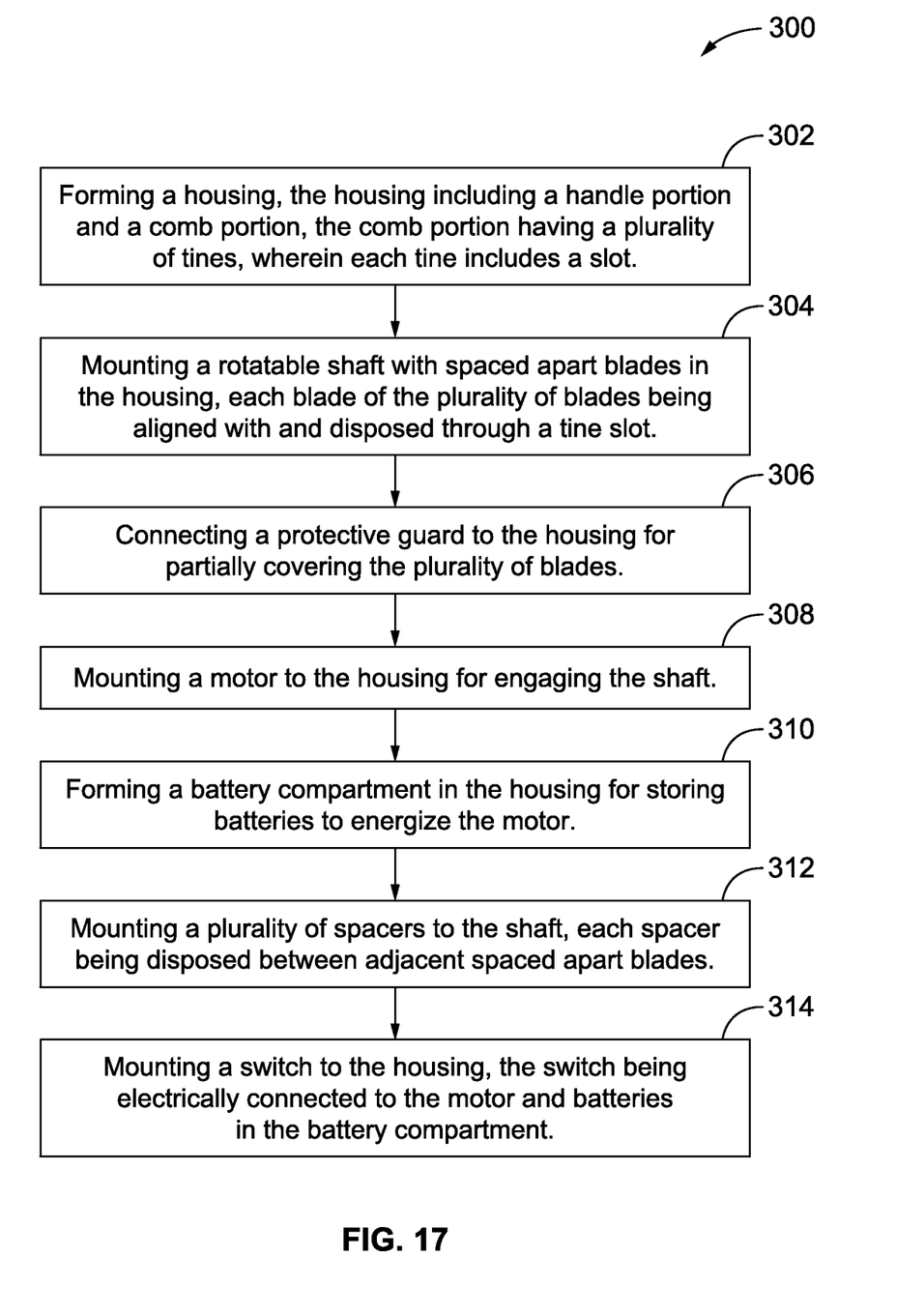
FIG. 17 is a flow diagram of a method for making a grooming apparatus.

The present invention also includes a method 300, FIG. 17, for making a grooming apparatus, the steps of the method including forming a housing, the housing including a handle portion and a comb portion, the comb portion having a plurality of tines, wherein each tine includes a slot 302, mounting a rotatable shaft with spaced apart blades in the housing, each blade of the plurality of blades being aligned with and disposed through a tine slot 304, connecting a protective guard to the housing for partially covering the plurality of blades 306, mounting a motor to the housing for engaging the shaft 308, and forming a battery compartment in the housing for storing batteries to energize the motor 310. The method may also include the steps of mounting a plurality of spacers to the shaft, each spacer being disposed between adjacent spaced apart blades 312, and mounting a switch to the housing, the switch being electrically connected to the motor and batteries in the battery compartment 314.

The grooming apparatus disclosed in detail above have the important advantages of reducing injury by not pulling on the skin when hair or fur is groomed, of being easy to operate, and yet the grooming apparatus is simply constructed, producible at a reasonable cost and structurally robust. From the foregoing, it can be seen that there has been provided features for an improved grooming apparatus and a disclosure of a method for making the apparatus. While a preferred and other embodiments of the present invention has been shown and described in detail, it will be obvious to those skilled in the art that changes and modifications may be made as shown without departing from the invention in its broader aspects. Therefore, the aim is to cover all such changes and modifications as fall within the true spirit and scope of the invention. The matters set forth in the foregoing description and accompanying drawings are offered by way of illustrations only and not as limitations. The actual scope of the invention is to be defined by the subsequent claims when viewed in their proper perspective based on the prior art.

What is claimed is:

1. A grooming apparatus comprising:
a housing including a handle portion and a comb portion, the comb portion having a plurality of tines, wherein a slot is positioned within each of the tines;
a rotatable shaft mounted in the housing;
a plurality of blades activated with the shaft, each blade of the plurality of blades being disposed in a corresponding slot;
a protective guard connected to the housing and partially covering the plurality of blades, thereby exposing a portion of each blade through a corresponding slot opening and allowing hair and fur picked up by the tines to be directed to the blades; and
structure connected to the shaft and mounted in the housing for causing the shaft to rotate.

2. The grooming apparatus of claim 1, including:
a plurality of spacers mounted to the shaft, the spacers alternating with the blades.

3. The grooming apparatus of claim 1, wherein:
the structure connected to the shaft and mounted in the housing for causing the shaft to rotate includes a battery-operated motor.

4. The grooming apparatus of claim 1, wherein:
the each blade of the plurality of blades is disk shaped.

5. The grooming apparatus of claim 1, wherein:
each tine of the plurality of tines extends outward from a proximal end to a distal end, wherein each tine is tapered with a rounded forward nose portion at the distal end.

6. The grooming apparatus of claim 2, wherein:
the comb portion of the housing includes a removable access port to expose the blades and the spacers.

7. The grooming apparatus of claim 6, wherein:
the access port includes a pick.

8. The claim 1, wherein the corresponding slot opening extends around the blade to expose the portion of the blade.

9. A grooming apparatus comprising: a housing including a handle portion and a comb portion, the comb portion having a plurality of tines wherein a slot is positioned within each tine; a rotatable shaft mounted in the housing; a plurality of blades activated with the shaft, each blade of the plurality of blades being aligned with and disposed in a slot in a corresponding tine of the plurality of tines, wherein a portion of each blade is exposed through a corresponding slot opening that allows hair and fur picked up by the tines to be directed to the blades; a protective guard connected to the housing and partially covering the plurality of blades; and a motor connected to the shaft and mounted in the housing for causing the shaft to rotate.

10. The grooming apparatus of claim 9, including:
a plurality of spacers mounted to the shaft, the spacers alternating with the blades of the plurality of blades.

11. The grooming apparatus of claim 10, wherein:
the comb portion of the housing includes a removable access port to expose the blades and the spacers; and
the access port includes a pick.

12. The grooming apparatus of claim 9, wherein:
each blade of the plurality of blades is disk shaped.

13. The grooming apparatus of claim 12, wherein each blade is substantially perpendicular to the longitudinal axis of the rotatable shaft.

14. The grooming apparatus of claim 9, wherein:
each tine of the plurality of tines extends outward from a proximal end to a distal end, wherein each tine is tapered with a rounded forward nose portion at the distal end.

15. The grooming apparatus of claim 9, wherein:
the comb portion of the housing includes a removable access port to expose the blades and the spacers.

16. The grooming apparatus of claim 9, wherein the comb portion further comprises first and second guide tines positioned at opposite ends of the plurality of tines.

17. The claim 9, wherein each blade extends into the corresponding slot opening.

18. A method for making a grooming apparatus, the steps of the method comprising: forming a housing, the housing including a handle portion and a comb portion, the comb portion having a plurality of tines, wherein a tine slot is positioned within each tine; mounting a shaft with a plurality of spaced apart blades in the housing, each blade of the plurality of blades being aligned with and disposed in a corresponding tine slot; connecting a protective guard to the housing for partially covering the plurality of blades; mounting a motor to the housing for engaging the shaft; and forming a battery compartment in the housing for storing batteries to energize the motor.

19. The method of claim 18, including the step of:
mounting a plurality of spacers to the shaft, each spacer being disposed between adjacent spaced apart blades.

20. The method of claim 19, including the step of:
mounting a switch to the housing, the switch electrically connected to the motor and batteries in the battery compartment.

* * * * *